US012668089B2

(12) United States Patent
Blanchard et al.

(10) Patent No.: US 12,668,089 B2
(45) Date of Patent: Jun. 30, 2026

(54) SUSPENSION THRUST BEARING ASSEMBLY

(71) Applicant: AKTIEBOLAGET SKF, Gothenburg (SE)

(72) Inventors: Xavier Blanchard, Saint-Cyr-sur-Loire (FR); Romain Medarian, Tours (FR); Paul Rabourdin, Chambray lès Tours (FR); Bruno Montboeuf, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 32 days.

(21) Appl. No.: 18/672,305

(22) Filed: May 23, 2024

(65) Prior Publication Data

US 2024/0401644 A1 Dec. 5, 2024

(30) Foreign Application Priority Data

May 31, 2023 (FR) ...................................... 2305382

(51) Int. Cl.
B60G 15/06 (2006.01)
F16C 19/10 (2006.01)

(52) U.S. Cl.
CPC ...... B60G 15/067 (2013.01); B60G 2204/418 (2013.01); F16C 19/10 (2013.01); F16C 2326/05 (2013.01)

(58) Field of Classification Search
CPC .... F16C 19/10; F16C 2326/05; B60G 15/067; B60G 15/068; B60G 2204/418
See application file for complete search history.

(56) References Cited

U.S. PATENT DOCUMENTS

| | | | |
|---|---|---|---|
| 2016/0082800 A1* | 3/2016 | Sakairi ................... | F16C 17/10 384/297 |
| 2016/0221409 A1* | 8/2016 | Jang ...................... | B60G 13/003 |
| 2018/0335089 A1* | 11/2018 | Shaikh ................... | G01B 21/16 |
| 2020/0062062 A1* | 2/2020 | Jeong ................... | B60G 15/067 |
| 2021/0222733 A1* | 7/2021 | Blanchard ............ | B60G 15/063 |
| 2022/0090624 A1* | 3/2022 | Song ..................... | F16C 33/102 |

FOREIGN PATENT DOCUMENTS

| | | | | |
|---|---|---|---|---|
| DE | 102007024582 A1 * | 11/2008 | ............ | F16C 33/467 |
| DE | 102020202617 A1 * | 9/2021 | .......... | B60G 15/067 |
| FR | 3101279 A1 | 4/2021 | | |
| JP | 07269562 A * | 10/1995 | | |
| WO | WO-2015014760 A1 * | 2/2015 | .......... | B60G 15/068 |

OTHER PUBLICATIONS

Machine Translation of JP-07269562-A (Year: 1995).*
Machine Translation of DE-102007024582-A1 (Year: 2008).*
Machine Translation of WO-2015014760-A1 (Year: 2015).*
Machine Translation of DE-102020202617-A1 (Year: 2021).*
Preliminary Search Report from the French Patent Office dated Jan. 4, 2024 in related French application No. FR2305382, including Search Report and Written Opinion.

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A suspension thrust bearing assembly includes a lower support cap, an upper bearing cap having an annular upper surface facing axially away from the lower support cap, and at least one bearing disposed between the caps. The annular upper surface includes a plurality of axially projecting protuberances spaced apart in the circumferential direction.

14 Claims, 3 Drawing Sheets

SUSPENSION THRUST BEARING ASSEMBLY

CROSS-REFERENCE

This application claims priority to French patent application no. 2305382 filed on May 31, 2023, the contents of which are fully incorporated herein by reference.

TECHNOLOGICAL FIELD

The present disclosure is directed to a suspension thrust bearing assembly for the suspension struts of the steered wheels of motor vehicles.

BACKGROUND

A suspension thrust bearing assembly generally comprises a rolling bearing that forms an axial thrust bearing and upper and lower caps that form a housing for the rings of the rolling bearing and that provide an interface between those rings and the neighboring elements.

The suspension thrust bearing assembly is positioned at the upper part of the suspension strut between a suspension spring and an upper bearing seat or cup that comes into contact with a part of the chassis of the vehicle. The suspension spring is mounted around a shock-absorber piston rod, the end of which is connected to the chassis of the vehicle. The suspension spring, of the helical spring type, bears axially, directly or indirectly, on the lower cap of the suspension thrust bearing assembly.

The suspension thrust bearing assembly makes it possible to transmit axial and radial loads between the suspension spring and the chassis of the vehicle while still allowing a relative rotational movement between the lower cap and the upper cap that may be caused by turning the steered wheels of the vehicle and/or by the compression of the suspension spring.

SUMMARY

The present disclosure aims to reduce the manufacturing costs for the known suspension thrust bearing assemblies.

The disclosure is directed to a suspension thrust bearing assembly comprising a lower support cap, an upper bearing cap, and at least one bearing disposed between the caps. The upper bearing cap is provided with an annular upper surface directed (facing) axially away from the lower support cap.

According to one general feature of the disclosure, the annular upper surface of the upper bearing cap is provided with a plurality of protuberances that project axially and are spaced apart in the circumferential direction. The protuberances of the upper bearing cap delimit a bearing surface, which is discontinuous in the circumferential direction, for the upper bearing seat that comes into contact with the chassis of the vehicle.

In this way, the quantity of material used to manufacture of the upper bearing cap is reduced, thereby reducing the cost and weight of the suspension thrust bearing assembly.

As a preference, the protuberances of the upper bearing cap are formed with the annular upper surface and from the same material as the annular upper surface. This allows a further reduction in the cost of the suspension thrust bearing assembly because ribs (discussed hereinafter) are formed at the same time as the annular upper surface of the upper bearing cap, notably by molding.

With this same aim of reducing costs, the upper bearing cap is preferably produced as a single piece.

Alternatively, it is still, however, possible to provide for the protuberances of the upper bearing cap to be attached to the annular upper surface. In that case, the protuberances are manufactured separately and fixed to the annular upper surface of the upper bearing cap by any suitable means, for example by bonding or sticking.

As a preference, the protuberances of the upper bearing cap are spaced uniformly in the circumferential direction.

In one embodiment, the protuberances of the upper bearing cap extend from the internal edge of the annular upper surface. The protuberances may remain at some distance from the external edge of the annular upper surface.

In one embodiment, the upper bearing cap comprises a plurality of reinforcing ribs which connect to the internal edge of the annular upper surface. At least a part of the protuberances may lie in the continuation of one of the reinforcing ribs when considering a radial direction.

In one embodiment, the annular upper surface of the upper bearing cap extends radially. The upper surface is thus directed perpendicular to the axis of the device.

In an alternative design, the annular upper surface of the upper bearing cap is directed perpendicular to an axis that makes a non-zero angle with the axis of the device.

BRIEF DESCRIPTION OF THE DRAWINGS

The present invention will be better understood on studying the detailed description of embodiments, given by way of non-limiting example and illustrated by the appended drawings, in which.

DETAILED DESCRIPTION

Figure 1:
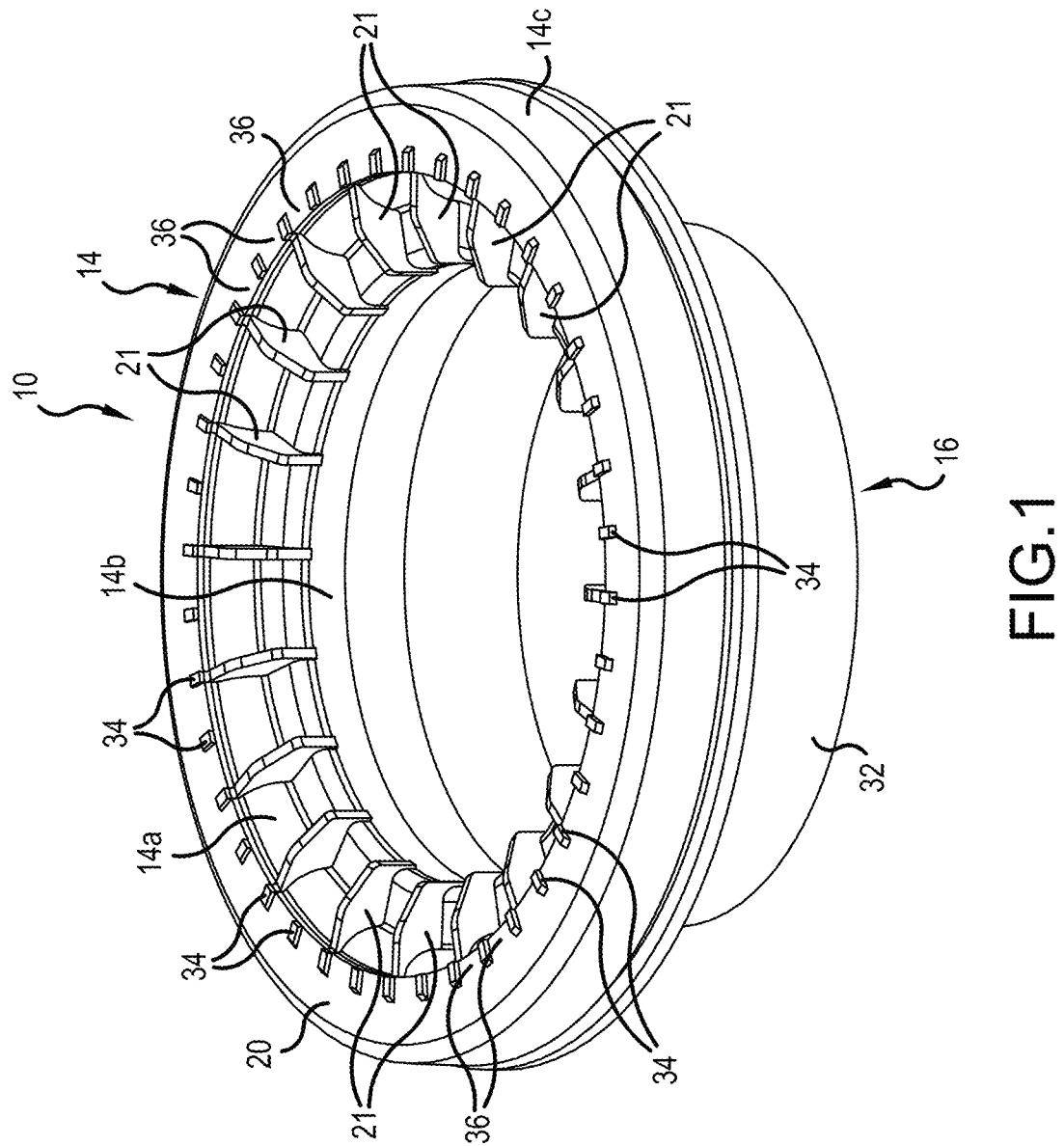
FIG. 1 is a perspective view of a suspension thrust bearing assembly according to a first exemplary embodiment of the disclosure.
Figure 2:
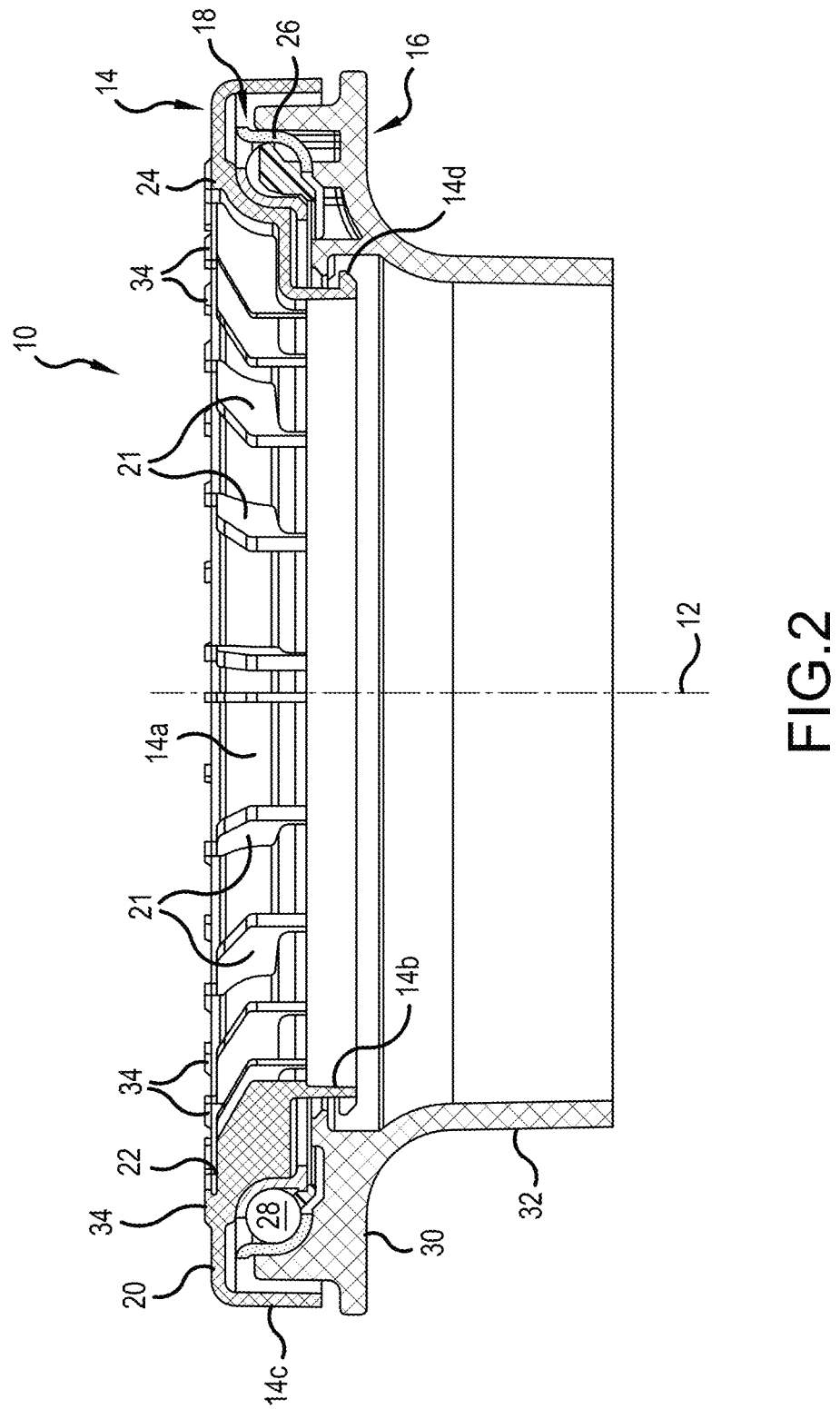
FIG. 2 is a sectional view of the thrust bearing assembly of FIG. 1.

The suspension thrust bearing assembly 10 depicted in FIGS. 1 and 2 is suitable for installation between an upper bearing seat or cup that comes into contact with a fixed chassis element of a motor vehicle and a suspension spring of the helical type. In FIGS. 1 and 2, the device 10 is shown in a position assumed to be vertical.

The device 10 has a central axis 12 and comprises an upper bearing cap 14, a lower support cap 16, and a rolling bearing 18 interposed axially between the caps. In the example illustrated, the upper bearing cap 14 and the lower support cap 16 are mounted in direct contact with the bearing 18 without the interposition of an intermediate element. Alternatively, the upper bearing cap 14 and the lower support cap 16 may be mounted in indirect contact with the bearing 18 with the interposition of an intermediate element.

As will be described in greater detail below, the upper bearing cap 14 is configured to delimit a bearing surface that is discontinuous in the circumferential direction for the upper bearing seat.

The upper bearing cap 14 may be formed as a single piece, for example made of plastic material, for example such as polyamide PA 6.6, which may or may not be glass-fiber reinforced.

The bearing cap 14 has a radial portion 14a, an annular axial internal skirt 14b, and an annular axial external skirt 14c radially surrounding the internal skirt. The radial portion 14a has an annular upper surface 20 intended to face the upper bearing seat and an opposite lower surface 22 in contact with the bearing 18. The upper surface 20 and lower surface 22 define the thickness of the radial portion 14a. In the example illustrated, the radial portion 14a has a stepped shape. The upper surface 20 forms the upper surface of the bearing cap 14. The upper surface 20 is directed axially away from the lower support cap 16. The upper surface 20 is continuous in the circumferential direction.

The external skirt 14c partially radially surrounds the lower support cap 16 and extends axially from the radial portion 14a. In the example illustrated, the external skirt 14c may be described as an extension of a large-diameter edge of the radial portion 14a.

The internal skirt 14b of the bearing cap extends inside the bore of the lower support cap 16 and axially downwards from the radial portion 14a. The internal skirt 14b may be described as an extension of a small-diameter edge of the radial portion 14a.

The upper bearing cap 14 further comprises a plurality of internal hooks 14d that are disposed on the internal skirt 14b and extend radially outwards in the direction of the lower support cap 16. In the example illustrated, the hooks 14d are spaced apart from one another in the circumferential direction. Alternatively, it could be possible to provide a single annular hook.

The upper bearing cap 14 comprises a plurality of reinforcing ribs 21 extending inwards from the bore of the radial portion 14a. The ribs 21 are spaced apart from one another in the circumferential direction. The upper end of each rib 21 connects to the internal edge of the annular upper surface 20.

The bearing 18 is situated entirely radially between the skirts 14b, 14c of the upper bearing cap 14 and comprises an upper ring 24 in contact with the upper bearing cap 14, a lower ring 26 in contact with the lower support cap 16, and a row of rolling elements 28, in this case balls, disposed between the raceways formed on the upper and lower rings 24, 26. In the example illustrated, the rolling bearing 18 is of the angular contact type. The upper ring 24 is in contact with the lower surface 22 of the radial portion 14a of the upper bearing cap. The lower ring 26 is in contact with an upper surface of the lower support cap 16.

The lower support cap 16 in this case is a body formed in a single piece, for example made of plastic material, for example polyamide PA 6.6, which may or may not be glass-fiber reinforced.

The lower support cap 16, of axis 12, comprises an annular radial portion 30 in the form of a plate in contact with the lower ring 26 of the bearing and an annular axial skirt 32 which extends from a small-diameter edge of the radial portion 30. The skirt 32 extends axially away from the upper bearing cap 14 and from the bearing 18. The skirt 32 centers the suspension spring.

As indicated earlier, the upper bearing cap 14 is configured to delimit a bearing surface for the upper bearing seat that is discontinuous in the circumferential direction.

The annular upper surface 20 of the bearing cap 14 is provided with a plurality of axially projecting protuberances 34. The protuberances 34 project axially upwards, i.e. away from the lower support cap 16. The protuberances 34 project relative to the upper surface 20. The protuberances 34 here are produced as a single piece with the annular upper surface 20.

The protuberances 34 are spaced apart, in this instance uniformly, from one another in the circumferential direction on the annular upper surface 20 of the bearing cap 14. Between two successive protuberances 34 in the circumferential direction there remains a smooth zone 36 on the upper surface 20. What is meant by a "smooth zone" is a zone on the annular upper surface 20 that is devoid of any projecting protuberance. When considering the circumferential direction, there is an alternation of protuberances 34 and of smooth zones 36. The upper surfaces of the protuberances 34 delimit the bearing surface, which is discontinuous in the circumferential direction, for the upper bearing seat.

In the exemplary embodiment illustrated, the protuberances 34 are identical to one another. Alternatively, the protuberances 34 could be non-identical. In the exemplary embodiment illustrated, the protuberances 34 extend from the internal edge of the annular upper surface 20 and are radially spaced from the external edge of the surface. Alternatively, the protuberances 34 could extend across the entire radial width of the upper surface 20 and thus connect to the external edge of the upper surface 20. As a variant, the protuberances 34 could extend from the external edge of the annular upper surface 20 and remain some distance from the internal edge of the surface. Alternatively, the protuberances 34 could remain at some distance from the internal and external edges of the surface.

In the exemplary embodiment illustrated, there are provided a first group of protuberances in which each of the protuberances of this group lies in the continuation of one of the ribs 23 (is radially aligned with one of the ribs 23) when considering a radial direction, and a second group of protuberances in which each of the protuberances of this group lies circumferentially between two successive protuberances of the first group.

Figure 3:
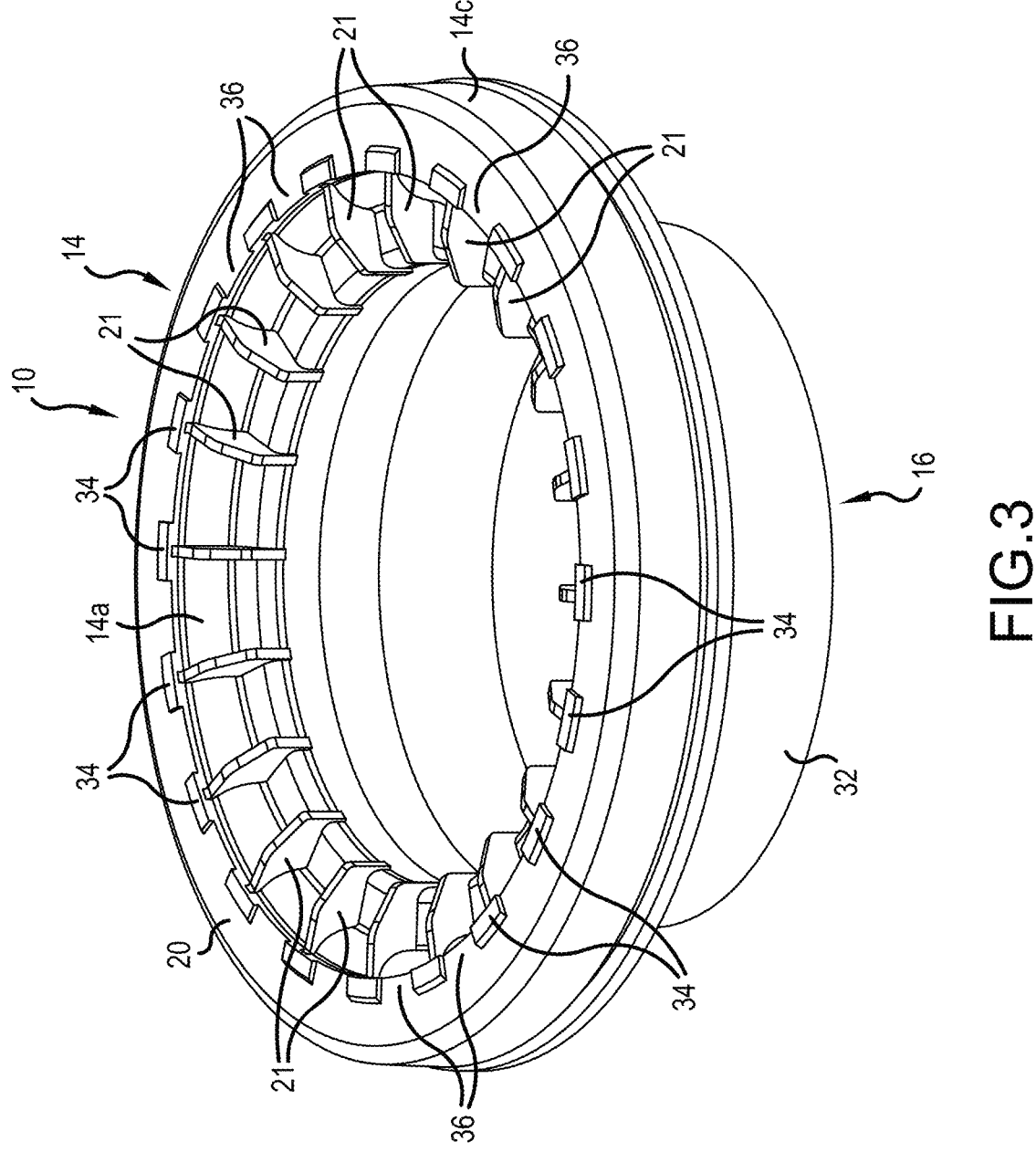
FIG. 3 is a perspective view of a suspension thrust bearing assembly according to a second exemplary embodiment of the disclosure.

Alternatively, it is possible to provide other arrangements of the protuberances 34, as illustrated for example in the exemplary embodiment illustrated in FIG. 3, in which elements that are identical bear the same references. In this example, each of the protuberances 34 lies in the continuation of one of the ribs 23 (lies radially outward of one of the ribs). In comparison with the first example, the protuberances 34 thus have a larger circumferential dimension. Alternatively, each protuberance 34 could lie between two ribs 23, when considering the circumferential direction.

In the exemplary embodiments illustrated, the protuberances 34 have a rectangular shape. Alternatively, the protuberances 34 can have other shapes, for example square, triangular, etc.

In the exemplary embodiments illustrated, the protuberances 34 are arranged on the annular upper surface 20 in such a way as to form a single ring of protuberances. Alternatively, the upper surface 20 could be provided with a plurality of rings of protuberances 34.

In the exemplary embodiments illustrated, the device comprises an angular contact rolling bearing provided with one row of balls. The device may comprise other types of rolling bearings, for example a bearing of the four-point contact type and/or with at least two rows of balls. The rolling bearing may comprise other types of rolling elements, for example rollers. In another variant, the bearing of the device may comprise a plain bearing devoid of rolling elements and provided with one or more rings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved suspension thrust bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A suspension thrust bearing assembly comprising:
a lower support cap,
an upper bearing cap having an uppermost annular surface facing axially away from the lower support cap, the uppermost annular surface including an internal edge, and
at least one bearing disposed between the lower support cap and the upper bearing cap,
wherein the uppermost annular surface includes a plurality of circumferentially spaced protuberances projecting axially away from the uppermost annular surface, and
wherein the protuberances extend radially outward from the internal edge.

2. The suspension thrust bearing assembly according to claim 1,
wherein the protuberances and the uppermost annular upper surface are formed as one piece.

3. The suspension thrust bearing assembly according to claim 1,
wherein the upper bearing cap and the protuberances are formed as one piece.

4. The suspension thrust bearing assembly according to claim 1,
wherein the protuberances are uniformly circumferentially spaced.

5. The suspension thrust bearing assembly according to claim 1,
wherein the protuberances are radially spaced from an external edge of the uppermost annular surface.

6. The suspension thrust bearing assembly according to claim 1,
wherein the upper bearing cap comprises a plurality of reinforcing ribs connected to the internal edge of the uppermost annular surface, and
wherein a first subset of the protuberances are located directly radially outward of one of the plurality of reinforcing ribs.

7. The suspension thrust bearing assembly according to claim 6,
wherein a second subset of the protuberances are located circumferentially between adjacent pairs of the plurality of reinforcing ribs.

8. The suspension thrust bearing assembly according to any claim 1,
wherein the uppermost annular surface extends radially.

9. The suspension thrust bearing assembly according to claim 1,
wherein the upper bearing cap is annular and has a central opening,
wherein the lower support cap is annular and has a center opening,
wherein the upper bearing cap and lower support cap are coaxially aligned, and
wherein the uppermost annular surface of the upper bearing cap is perpendicular to a central rotational axis of the device.

10. The suspension thrust bearing assembly according to claim 1,
wherein the upper bearing cap comprises a plurality of reinforcing ribs connected to the internal edge of the uppermost annular surface, and
wherein a first subset of the protuberances are located circumferentially between adjacent pairs of the plurality of reinforcing ribs.

11. The suspension thrust bearing assembly according to claim 1,
wherein a radial dimension of the protuberances is greater than a circumferential dimension of the protuberances.

12. The suspension thrust bearing assembly according to claim 1,
wherein a circumferential dimension of the protuberances is greater than a radial dimension of the protuberances.

13. A suspension thrust bearing assembly comprising:
a lower support cap,
an upper bearing cap having an annular upper surface facing axially away from the lower support cap, and
at least one bearing disposed between the caps,
wherein the annular upper surface includes a plurality of axially projecting protuberances spaced apart in a circumferential direction,
wherein the upper bearing cap and the protuberances are formed as one piece,
wherein the protuberances are uniformly spaced in the circumferential direction,
wherein the protuberances extend radially outward from an internal edge of the annular upper surface and are radially spaced from an external edge of the annular upper surface,
wherein the upper bearing cap comprises a plurality of reinforcing ribs connected to the internal edge of the annular upper surface, and
wherein a first subset of the protuberances are located directly radially outward of one of the plurality of reinforcing ribs.

14. The suspension thrust bearing assembly according to claim 13,
including a second subset of the protuberances located circumferentially between adjacent pairs of the plurality of reinforcing ribs.

* * * * *